United States Patent
Liu et al.

(10) Patent No.: US 8,555,256 B2
(45) Date of Patent: Oct. 8, 2013

(54) PASS-BY BREAKPOINT SETTING AND DEBUGGING METHOD AND DEVICE

(75) Inventors: Xiangbin Liu, Shenzhen (CN); Luoying Yin, Shenzhen (CN); Sen Zhang, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 0 days.

(21) Appl. No.: 13/523,279

(22) Filed: Jun. 14, 2012

(65) Prior Publication Data

US 2012/0254666 A1    Oct. 4, 2012

Related U.S. Application Data

(63) Continuation of application No. PCT/CH2010/078866, filed on Nov. 18, 2010.

(30) Foreign Application Priority Data

Dec. 14, 2009  (CN) .......................... 2009 1 0242373

(51) Int. Cl.
*G06F 9/44* (2006.01)
*G06F 11/28* (2006.01)

(52) U.S. Cl.
USPC .............. 717/129; 717/124; 717/126; 714/35

(58) Field of Classification Search
None
See application file for complete search history.

(56) References Cited

U.S. PATENT DOCUMENTS

| | | | |
|---|---|---|---|
| 4,819,234 A * | 4/1989 | Huber ........................... | 717/129 |
| 4,866,665 A * | 9/1989 | Haswell-Smith ............... | 714/35 |
| 6,516,408 B1 * | 2/2003 | Abiko et al. ................... | 712/227 |
| 6,948,053 B2 * | 9/2005 | Augsburg et al. .............. | 712/233 |
| 7,950,001 B2 * | 5/2011 | Panchamukhi et al. ....... | 717/124 |
| 2003/0061599 A1 | 3/2003 | Bates et al. | |
| 2003/0163677 A1 * | 8/2003 | Augsburg et al. ............. | 712/233 |

(Continued)

FOREIGN PATENT DOCUMENTS

| CN | 1271896 A | 11/2000 |
|---|---|---|
| CN | 101120321 A | 2/2008 |

(Continued)

OTHER PUBLICATIONS

Aniszczyk, C., et al., Debugging with the Eclipse Platform, IBM developerWorks, May 1, 2007, 7 pages, [retrieved on Jul. 31, 2013], Retrieved from the Internet: <URL:http://www.ibm.com/developerworks/library/os-ecbug/>.*

(Continued)

*Primary Examiner* — Thuy Do
*Assistant Examiner* — Geoffrey St Leger
(74) *Attorney, Agent, or Firm* — Brinks Hofer Gilson & Lione

(57) ABSTRACT

A method and device for pass-by breakpoint setting and debugging. The pass-by breakpoint setting method comprises: receiving a breakpoint setting command; determining an instruction at a breakpoint in a source program code according to the breakpoint setting command; if one of the instruction at the breakpoint and an instruction prior to the instruction at the breakpoint is a relative jump instruction, setting an instruction duplicate, and setting the instruction at the breakpoint in the source program code as a first abnormal instruction.

11 Claims, 5 Drawing Sheets

(56) References Cited

U.S. PATENT DOCUMENTS

| | | | |
|---|---|---|---|
| 2003/0204837 A1* | 10/2003 | Bates et al. | 717/126 |
| 2004/0083458 A1* | 4/2004 | Gschwind et al. | 717/129 |
| 2005/0034024 A1 | 2/2005 | Alverson et al. | |
| 2006/0069959 A1* | 3/2006 | Schultz | 714/35 |
| 2006/0174163 A1 | 8/2006 | Gravoille et al. | |
| 2007/0006158 A1* | 1/2007 | Takuma et al. | 717/124 |
| 2007/0300209 A1 | 12/2007 | Bates et al. | |
| 2009/0217095 A1 | 8/2009 | Bussa et al. | |
| 2009/0320001 A1* | 12/2009 | Bates et al. | 717/129 |

FOREIGN PATENT DOCUMENTS

| | | | |
|---|---|---|---|
| CN | 101142560 A | | 3/2008 |
| FR | 2 880 963 | | 7/2006 |
| JP | 05241889 A | * | 9/1993 |
| JP | 2007080118 A | * | 3/2007 |

OTHER PUBLICATIONS

Rawlings, N., Interactive Fortran, the debugger was brilliant, Computer History Museum, 1 page, Jan. 24, 2006, [retrieved on Jul. 31, 2013], Retrieved from the Internet: <URL: http://corphist.computerhistory.org/corphist/view.php?s=stories&id=131>.*

Extended European Search Report issued in corresponding European Patent Application No. 10837002.4, mailed Nov. 13, 2012.

Written Opinion of the International Searching Authority issued in corresponding PCT Application No. PCT/CN2010/078866; mailed Feb. 24, 2011.

International Search Report of the International Searching Authority issued in corresponding PCT Application No. PCT/CN2010/078866; mailed Feb. 24, 2011.

Liu. Juan et al. "A Prallel Debugger with Fast Conditional Breakpoint." Journal of Software. vol. 14. No. 11. Accepted Mar. 4, 2003:1827-1833.

* cited by examiner

PASS-BY BREAKPOINT SETTING AND DEBUGGING METHOD AND DEVICE

CROSS-REFERENCE TO RELATED APPLICATIONS

This application is a continuation of International Application No. PCT/CN2010/078866, filed on 18 Nov. 2010, which claims priority to Chinese Patent Application No. 200910242373.9, filed on Dec. 14, 2009, both of which are hereby incorporated by reference in their entireties.

FIELD OF THE INVENTION

The present invention relates to the field of computer, and more particularly to pass-by breakpoint setting and debugging technique as well as to pass-by breakpoint based program debugging technique.

BACKGROUND OF THE INVENTION

Since a non-pass-by breakpoint causes interruption of a running program, while pass-by breakpoint not only interrupts the normal running of a program, but also records relevant information when the breakpoint is triggered. Therefore, pass-by breakpoint is usually used in the program debugging technique.

Currently available pass-by breakpoint setting method and program debugging method mainly includes the following.

All of a source program code is backuped in a memory space, an instruction at a breakpoint in the source program code is modified as Break, and an instruction next to the instruction at the breakpoint in the backuped code is modified as Break. Thus, after the Break is executed in the source program code, the process jumps to the backed-up code to cause a second Break, and thereafter jumps back to the source program code and continues to execute program code after the Break in the source program code. Alternatively, an instruction at the breakpoint in the source program code is modified as Break, and after the Break is executed in the source program code, an advanced language is used to manually parse the instruction at the breakpoint. Thereafter, PC++ is used to jump to an instruction next to the Break in the source program code, and the process continues to execute the source program code.

The inventor found during realization of the present invention that existing solutions require relatively much memory space as occupied.

SUMMARY OF THE INVENTION

A pass-by breakpoint setting and debugging method and device provided by embodiments of the present invention make it possible to reduce occupy memory space.

A pass-by breakpoint setting method provided by an embodiment of the present invention comprises: receiving a breakpoint setting command; determining an instruction at a breakpoint in a source program code according to the breakpoint setting command; if one of the instruction at the breakpoint and an instruction prior to the instruction at the breakpoint is a relative jump instruction, setting an instruction duplicate for the relative jump instruction and an instruction next to the relative jump instruction, and setting the instruction at the breakpoint in the source program code as a first abnormal instruction; wherein setting the instruction duplicate comprises storing the relative jump instruction and an instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction, setting a second valid instruction next to the relative jump instruction in the instruction duplicate as a second abnormal instruction, and setting an instruction next to the absolute jump instruction as an invalid instruction.

A pass-by breakpoint debugging method provided by an embodiment of the present invention comprises: determining an abnormal instruction that causes breakpoint abnormality; obtaining and outputting site information of the breakpoint abnormality when the breakpoint abnormality is caused by a first abnormal instruction, instructing to execute an instruction prior to an instruction at the breakpoint in an instruction duplicate when the breakpoint abnormality is occurred in a delay slot, and instructing to execute the instruction at the breakpoint in the instruction duplicate when the breakpoint abnormality is not occurred in the delay slot; and if the breakpoint abnormality is caused by a second abnormal instruction, instructing to execute an instruction next to the instruction at the breakpoint in the source program code when the breakpoint abnormality is occurred in the delay slot, and instructing to execute a second instruction next to the instruction at the breakpoint in the source program code when the breakpoint abnormality is not occurred in the delay slot.

A pass-by breakpoint setting device provided by an embodiment of the present invention comprises: a receiving module for receiving a breakpoint setting command; a determining module for determining an instruction at a breakpoint in a source program code according to the breakpoint setting command; a first setting module for, if one of the instruction at the breakpoint and an instruction prior to the instruction at the breakpoint is a relative jump instruction, setting an instruction duplicate for the relative jump instruction and an instruction next to the relative jump instruction and setting the instruction at the breakpoint in the source program code as a first abnormal instruction; wherein setting the instruction duplicate comprises storing the relative jump instruction and an instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction, setting a second valid instruction next to the relative jump instruction in the instruction duplicate as a second abnormal instruction, and setting an instruction next to the absolute jump instruction as an invalid instruction.

A pass-by breakpoint debugging device provided by an embodiment of the present invention comprises: a determining module for determining an abnormal instruction that causes breakpoint abnormality; a first abnormality processing module for obtaining and outputting site information of the breakpoint abnormality when the determining module determines that the breakpoint abnormality is caused by a first abnormal instruction, instructing to execute an instruction prior to an instruction at a breakpoint in an instruction duplicate when the breakpoint abnormality is occurred in a delay slot, and instructing to execute the instruction at the breakpoint in the instruction duplicate when the breakpoint abnormality is not occurred in the delay slot; and a second abnormality processing module for, if the determining module determines that the breakpoint abnormality is caused by a second abnormal instruction, instructing to execute an instruction next to the instruction at a breakpoint in a source program code when the breakpoint abnormality is occurred in the delay slot, and instructing to execute a second instruction next to the instruction at the breakpoint in the source program code when the breakpoint abnormality is not occurred in the delay slot.

A program debugging apparatus provided by an embodiment of the present invention comprises: a pass-by breakpoint setting device for receiving a breakpoint setting command, determining an instruction at a breakpoint in a source program code according to the breakpoint setting command, if one of the instruction at the breakpoint and an instruction prior to the instruction at the breakpoint is a relative jump instruction, setting an instruction duplicate for the relative jump instruction and an instruction next to the relative jump instruction, and setting the instruction at the breakpoint in the source program code as a first abnormal instruction, wherein setting the instruction duplicate comprises storing the relative jump instruction and an instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction, setting a second valid instruction next to the relative jump instruction in the instruction duplicate as a second abnormal instruction, and setting an instruction next to the absolute jump instruction as an invalid instruction; and a pass-by breakpoint debugging device for determining an abnormal instruction that causes breakpoint abnormality, obtaining and outputting site information of the breakpoint abnormality when the breakpoint abnormality is caused by a first abnormal instruction, instructing to execute an instruction prior to an instruction at the breakpoint in an instruction duplicate when the breakpoint abnormality is occurred in a delay slot, and instructing to execute the instruction at the breakpoint in the instruction duplicate when the breakpoint abnormality is not occurred in the delay slot, and if the breakpoint abnormality is caused by a second abnormal instruction, instructing to execute an instruction next to the instruction at the breakpoint in the source program code when the breakpoint abnormality is occurred in the delay slot, and instructing to execute a second instruction next to the instruction at the breakpoint in the source program code when the breakpoint abnormality is not occurred in the delay slot.

As can be known from the description of the above technical solutions, by determining the instruction at the breakpoint and the instruction prior to the instruction at the breakpoint, it is possible to select an associated instruction with respect to the relative jump instruction to set an instruction duplicate; by setting the invalid instruction and the absolute jump instruction, it is possible to realize setting of the pass-by breakpoint without changing the relative jump instruction in the instruction duplicate as far as practically possible. Accordingly, the memory space occupied by the duplicate can be reduced, and artificial errors brought in the process of setting the pass-by breakpoint can be reduced.

BRIEF DESCRIPTION OF THE DRAWINGS

To make clearer the explanation of technical solutions of the embodiments of the present invention, drawings needed in the description of the embodiments are briefly illustrated below. It is obvious that the drawings illustrated below are merely directed to some embodiments of the present invention, and it is possible for persons ordinarily skilled in the art to deduce other drawings from these drawings without creative effort.

DETAILED DESCRIPTION OF THE EMBODIMENTS

The technical solutions according to the embodiments of the present invention are clearly and completely described below with reference to the drawings. It is obvious that the embodiments as described below are merely partial, rather than entire, embodiments of the present invention. On the basis of the embodiments of the present invention, all other embodiments obtainable by persons ordinarily skilled in the art without creative effort shall all fall within the protection scope of the present invention.

First embodiment: Pass-by Breakpoint Setting Method. The flow of the method is as shown in FIG. 1.

Figure 1:
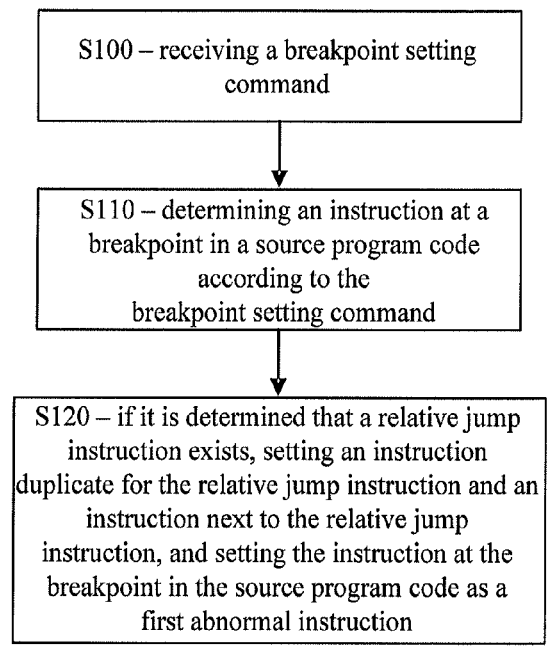
FIG. 1 is a flowchart illustrating a pass-by breakpoint setting method according to a first embodiment of the present invention.

In FIG. 1, S100: receiving a breakpoint setting command. The breakpoint setting command may include a breakpoint position information but does not include a breakpoint attribute information. The breakpoint setting command may also not only include a breakpoint position information but also include a breakpoint attribute information. The breakpoint position information herein is used to indicate which instruction in a source program code is a breakpoint instruction, and the breakpoint position information may include one or more of a name of the instruction, the number of line in which the instruction resides, and the instruction storage address. The breakpoint attribute information herein may include one or more of a condition for obtaining site information, a condition for outputting site information, information as to whether a task should be suspended after a breakpoint causes abnormality, and output path information of site information. The condition for obtaining site information is used to decide whether to obtain side information. The condition for outputting site information is used to decide whether to output the obtained site information. The information as to whether a task should be suspended after a breakpoint causes abnormality is used to decide whether the task should be suspended after breakpoint abnormality is occurred. The output path information of site information is used to indicate the destination address for output of the obtained site information. The condition for obtaining site information or the condition for outputting site information may include one or more of breakpoint triggered core information, jumped breakpoint information, and breakpoint and task binding information, the specific applications thereof will be exemplarily explained in subsequent embodiments.

As should be explained, the breakpoint setting command may also include other information, the breakpoint position information may be expressed in other forms, the breakpoint attribute information may include other attribute information associated with breakpoint, and the condition for obtaining site information or the condition for outputting site information may also include other information associated with site information obtaining or site information outputting. This embodiment does not restrict the contents specifically included in the breakpoint setting command, the breakpoint position information and the breakpoint attribute information, etc., the specific modes of expression thereof, and the specific protocols used by the breakpoint setting command, and so on.

S110: determining an instruction at a breakpoint in a source program code according to the received breakpoint setting command.

There are many specific modes of execution for determining an instruction at a breakpoint in a source program code according to a breakpoint setting command, and one concrete example is as follows: determining the instruction at the breakpoint in the source program code according to the breakpoint position information in the breakpoint setting command, for example, determining the instruction at the breakpoint in the source program code according to an instruction name and a number of line in which the instruction resides in the breakpoint position information; for further example, searching for a storage position, an instruction in which is precisely the instruction at the breakpoint, according to an instruction storage address in the breakpoint position information. This embodiment may also use other existing modes to determine an instruction at a breakpoint in a source program code, and this embodiment does not restrict the specific process for determining an instruction at a breakpoint in a source program code according to the breakpoint setting command.

S120: determining the instruction at the breakpoint and an instruction prior to the instruction at the breakpoint, if it is determined that one of the instruction at the breakpoint and the instruction prior to the instruction at the breakpoint is a relative jump instruction, setting an instruction duplicate for the relative jump instruction and an instruction next to the relative jump instruction, and setting the instruction at the breakpoint in the source program code as a first abnormal instruction. The relative jump instruction may be either the instruction at the breakpoint or the instruction prior to the instruction at the breakpoint.

In S120, the operation of setting an instruction duplicate for a relative jump instruction and an instruction next to the relative jump instruction specifically includes: storing the relative jump instruction and the instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction in the instruction duplicate being an original jump relative offset of the relative jump instruction, setting a second valid instruction next to the relative jump instruction in the instruction duplicate as a second abnormal instruction, and setting an instruction next to the absolute jump instruction as an invalid instruction. In a case that there is no invalid instruction between the relative jump instruction and the second abnormal instruction in the instruction duplicate, the second valid instruction next to the relative jump instruction is the second instruction next to the relative jump instruction. As should be explained, storage addresses of the instruction at the breakpoint, the relative jump instruction, and the instruction next to the relative jump instruction may be continuous, and may also be discontinuous, that is to say, there is an invalid instruction between two instructions.

The first abnormal instruction in the source program code is used to jump to the instruction duplicate to execute instructions in the instruction duplicate, while both the second abnormal instruction and the absolute jump instruction in the instruction duplicate are used to return to the source program code to continue to execute instructions in the source program code. For instance, the second abnormal instruction is used to return to the instruction next to the instruction at the breakpoint or to the second instruction next to the instruction at the breakpoint in the source program code, and the absolute jump instruction is used to return to the instruction at the breakpoint that is the relative jump instruction in the source program code or to the instruction to which the jump relative offset of the instruction prior to the instruction at the breakpoint is directed.

In S120, there are many specific processes for setting an instruction duplicate for a relative jump instruction and an instruction next to the relative jump instruction; correspondingly, the instruction duplicate as set also includes various different forms. Several examples are given below to exemplarily illustrate the process of setting an instruction duplicate and the instruction duplicate as set.

First example: once it is determined that one of the instruction at the breakpoint and the instruction prior to the instruction at the breakpoint is a relative jump instruction, the instruction prior to the instruction at the breakpoint, the instruction at the breakpoint, and the instruction next to the instruction at the breakpoint are stored in the instruction duplicate; the instruction prior to the instruction at the breakpoint, the instruction at the breakpoint, and the instruction next to the instruction at the breakpoint can be continuously stored in this order; of course, a invalid instruction may also be inserted between the instruction prior to the instruction at the breakpoint and the instruction at the breakpoint, and between the instruction at the breakpoint and the instruction next to the instruction at the breakpoint. The jump relative offset of the relative jump instruction in the instruction duplicate is set according to a storage position of the absolute jump instruction in the instruction duplicate, the jump absolute offset of the absolute jump instruction in the instruction duplicate is an original jump relative offset of the relative jump instruction, a second valid instruction next to the instruction at the breakpoint in the instruction duplicate is set as a second abnormal instruction, and an instruction next to the absolute jump instruction is set as an invalid instruction.

In other words, if one of the instruction at the breakpoint and the instruction prior to the instruction at the breakpoint is a relative jump instruction, the instruction duplicate as set according to the first example may include the instruction prior to the instruction at the breakpoint in the source program code, the instruction at the breakpoint in the source program code, the instruction next to the instruction at the breakpoint in the source program code, the second abnormal instruction, the absolute jump instruction and the invalid instruction. As should be explained, the jump relative offset of the relative jump instruction in the instruction duplicate is different from the jump relative offset of the relative jump instruction in the source program code.

Second example: once it is determined that the instruction prior to the instruction at the breakpoint is the relative jump instruction, the instruction prior to the instruction at the breakpoint and the instruction at the breakpoint are stored in the instruction duplicate; the instruction prior to the instruction at the breakpoint and the instruction at the breakpoint can be continuously stored in this order; of course, an invalid instruction may also be inserted between the instruction prior to the instruction at the breakpoint and the instruction at the breakpoint. The jump relative offset of the instruction prior to the instruction at the breakpoint in the instruction duplicate is set according to a storage position of the absolute jump instruction in the instruction duplicate, the jump absolute offset of the absolute jump instruction in the instruction duplicate is a jump relative offset of the instruction prior to the instruction at the breakpoint in the source program code, a valid instruction next to the instruction at the breakpoint (namely the second valid instruction next to the relative jump instruction) in the instruction duplicate is set as a second abnormal instruction, and an instruction next to the absolute jump instruction is set as an invalid instruction.

In other words, if the instruction prior to the instruction at the breakpoint is the relative jump instruction, the instruction duplicate as set according to the second example may not include the instruction next to the instruction at the breakpoint in the source program code, but include the instruction prior to the instruction at the breakpoint in the source program code, the instruction at the breakpoint in the source program code, the second abnormal instruction, the absolute jump instruction and the invalid instruction. As should be explained, the jump relative offset of the instruction prior to the instruction at the breakpoint in the instruction duplicate is different from the jump relative offset of the instruction prior to the instruction at the breakpoint in the source program code.

Third example: once it is determined that the instruction at the breakpoint is the relative jump instruction, the instruction at the breakpoint and the instruction next to the instruction at the breakpoint are stored in the instruction duplicate; the instruction at the breakpoint and the instruction next to the instruction at the breakpoint can be continuously stored in this order; of course, an invalid instruction may also be inserted between the instruction at the breakpoint and the instruction next to the instruction at the breakpoint. The jump relative offset of the instruction at the breakpoint in the instruction duplicate is set according to a storage position of the absolute jump instruction in the instruction duplicate, the jump absolute offset of the absolute jump instruction in the instruction duplicate is a jump relative offset of the instruction at the breakpoint in the source program code, a second valid instruction next to the instruction at the breakpoint (namely the second valid instruction next to the relative jump instruction) in the instruction duplicate is set as a second abnormal instruction, and an instruction next to the absolute jump instruction is set as an invalid instruction.

In other words, if the instruction at the breakpoint is the relative jump instruction, the instruction duplicate as set according to the third example may not include the instruction prior to the instruction at the breakpoint in the source program code, but include the instruction at the breakpoint in the source program code, the instruction next to the instruction at the breakpoint in the source program code, the second abnormal instruction, the absolute jump instruction and the invalid instruction. As should be explained, the jump relative offset of the instruction at the breakpoint in the instruction duplicate is different from the jump relative offset of the instruction at the breakpoint in the source program code.

The operation of setting an instruction duplicate described in S120 may optionally include setting the second or third valid instruction next to the relative jump instruction in the instruction duplicate as a third abnormal instruction. With respect to the aforementioned first example, the third valid instruction next to the instruction at the breakpoint in the instruction duplicate is set as the third abnormal instruction. With respect to the aforementioned second example, the second valid instruction next to the instruction at the breakpoint in the instruction duplicate is set as the third abnormal instruction. With respect to the aforementioned third example, the third valid instruction next to the instruction at the breakpoint in the instruction duplicate is set as the third abnormal instruction.

Usually, there is generally no circumstance in which two continuous instructions are both relative jump instructions in the source program code, but there may be the circumstance in which two continuous instructions are both not relative jump instruction. In this embodiment, if the instruction at the breakpoint and the instruction prior to the instruction at the breakpoint in the source program code are both not relative jump instructions, the instruction duplicate can be set only for the instruction at the breakpoint. Setting an instruction duplicate for the instruction at the breakpoint specifically includes storing the instruction at the breakpoint in the instruction duplicate, and setting a valid instruction next to the instruction at the breakpoint in the instruction duplicate as a second abnormal instruction. The second abnormal instruction is used to return to the source program code to continue to execute instructions in the source program code. For instance, returning to the instruction next to the instruction at the breakpoint in the source program code.

The instruction duplicate as set in this embodiment can be stored in a memory space. In addition, the aforementioned first, second and third abnormal instructions may either be identical with or different from one another. A concrete example for the first, second and third abnormal instructions is Break. The aforementioned invalid instruction may be nop or sync, and so on.

As can be known from the description of the above first embodiment, by determining whether the instruction at the breakpoint and the instruction prior to the instruction at the breakpoint are relative jump instructions, it is possible to select associated instructions with respect to the relative jump instruction to set an instruction duplicate, so as to avoid the phenomenon, as far as possible, in which the inclusion of too many instructions in the instruction duplicate leads the instruction duplicate to occupy too much memory space; by setting the absolute jump instruction and the invalid instruction, it is possible to realize setting of the pass-by breakpoint in a case that the relative jump instruction in the instruction duplicate is modified as less as possible, so as to avoid artificial errors brought in the process of setting the pass-by breakpoint as far as possible; by setting the second abnormal instruction and the absolute jump instruction in the instruction duplicate as capable of jumping back to the source program code, instructions in the source program code are continued to be executed; by setting the third instruction next to the instruction at the breakpoint in the instruction duplicate as a third abnormal instruction, a specific solving scheme is provided for the Likely-type relative jump instruction possibly included in the instruction duplicate. Finally, the pass-by breakpoint setting method provided by the above first embodiment saves memory space as occupied and enhances program debugging efficiency.

Second embodiment: Pass-by Breakpoint Debugging Method. The flow of the method is as shown in FIG. 2.

Figure 2:
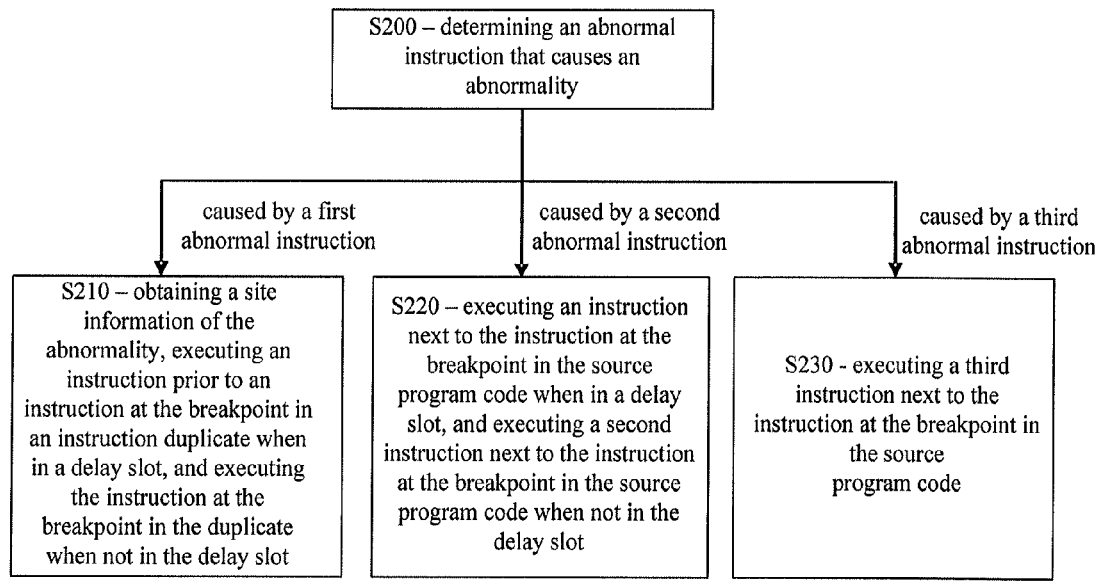
FIG. 2 is a flowchart illustrating a pass-by breakpoint debugging method according to a second embodiment of the present invention.

In FIG. 2, S200: determining an abnormal instruction that causes breakpoint abnormality; if the breakpoint abnormality is caused by a first abnormal instruction, the process goes to S210; if the breakpoint abnormality is caused by a second abnormal instruction, the process goes to S220. Optionally, S200 may also include: if the breakpoint abnormality is caused by a third abnormal instruction, the process goes to S230.

Optionally, an operation of determining whether abnormality is taken over may also be included prior to S200, namely to determine whether abnormality as occurring is breakpoint abnormality, and determine to take over the abnormality when it is determined that the abnormality is breakpoint abnormality, in which case the process goes to S200, otherwise the process does not go to S200, namely not to perform the pass-by breakpoint debugging operation recorded in this embodiment. The operation of determining whether abnormality is taken over can be realized by existing methods, and this embodiment does not restrict the specific process for determining whether abnormality is taken over.

S210: obtaining site information of the breakpoint abnormality and outputting the obtained site information, instructing to execute an instruction prior to an instruction at the breakpoint in an instruction duplicate when it is determined that the breakpoint abnormality is occurred in a delay slot (namely exiting breakpoint abnormality processing process, and continuing to perform normal instruction processing process from the instruction prior to the instruction at the breakpoint in the instruction duplicate), and instructing to execute the instruction at the breakpoint in the instruction duplicate when it is determined that the breakpoint abnormality is not occurred in the delay slot (namely exiting breakpoint abnormality processing process, and continuing to perform normal instruction processing process from the instruction at the breakpoint in the instruction duplicate).

In S210, the site information of the breakpoint abnormality can be firstly obtained, and it is then determined whether the obtained site information should be output; the obtained site information is output only when it is determined that the obtained site information should be output; otherwise the obtained site information is not output. This embodiment can also firstly determine whether the site information of the breakpoint abnormality should be obtained, and obtains the site information and directly outputs the obtained site information after it is determined that the site information of the breakpoint abnormality should be obtained; otherwise the site information is not obtained, and hence also not output. In addition, this embodiment may also perform an operation of determining whether to obtain the site information prior to obtaining the site information of the breakpoint abnormality, and perform an operation of determining whether to output the site information prior to outputting the site information. This embodiment may also not perform the operation of determining whether to obtain the site information and not perform the operation of determining whether to output the site information, but directly obtain the site information of the breakpoint abnormality, and directly output the obtained site information.

In S210, it is possible to determine whether the site information of the breakpoint abnormality should be obtained based on a condition for obtaining site information, and to perform the operation of obtaining the site information of the breakpoint abnormality after it is determined that the condition for obtaining site information is met.

A concrete example for obtaining the site information of the breakpoint abnormality is as follows: determining a core that causes the breakpoint abnormality, and obtaining the site information of the breakpoint abnormality if information of the core that causes the breakpoint abnormality belongs to breakpoint triggered core information in the condition for obtaining site information; otherwise not performing the operation of obtaining the site information of the breakpoint abnormality.

Another concrete example for obtaining the site information of the breakpoint abnormality is as follows: determining information of an abnormal instruction that causes the breakpoint abnormality, and obtaining the site information of the breakpoint abnormality if the information of the abnormal instruction that causes the breakpoint abnormality does not belong to jumped breakpoint information in the condition for obtaining site information; otherwise not performing the operation of obtaining the site information of the breakpoint abnormality.

A third concrete example for obtaining the site information of the breakpoint abnormality is as follows: determining a task that causes the breakpoint abnormality, and obtaining the site information of the breakpoint abnormality if information of the task that causes the breakpoint abnormality belongs to breakpoint and task binding information in the condition for obtaining site information; otherwise not performing the operation of obtaining the site information of the breakpoint abnormality.

The process of obtaining the site information of the breakpoint abnormality can also be realized by other modes, for instance, by combining the aforementioned three concrete examples or any two concrete examples. This embodiment does not restrict the specific process of obtaining of the site information of the breakpoint abnormality.

In S210, it is possible to determine whether the obtained site information should be output based on a condition for outputting site information, and to perform the operation of outputting the site information after it is determined that the condition for outputting site information is met.

A concrete example for outputting the site information is as follows: determining a core that causes the breakpoint abnormality, and outputting the obtained site information of the breakpoint abnormality if information of the core that causes the breakpoint abnormality belongs to breakpoint triggered core information in the condition for outputting site information; otherwise not performing the outputting operation.

Another concrete example for outputting the site information is as follows: determining information of an abnormal instruction that causes the breakpoint abnormality, and outputting the obtained site information of the breakpoint abnormality if the information of the abnormal instruction that causes the breakpoint abnormality does not belong to jumped breakpoint information in the condition for outputting site information; otherwise not performing the outputting operation.

A third concrete example for outputting the site information is as follows: determining a task that causes the breakpoint abnormality, and outputting the obtained site information of the breakpoint abnormality if information of the task that causes the breakpoint abnormality belongs to breakpoint and task binding information in the condition for outputting site information; otherwise not performing the outputting operation.

The process of outputting the site information of the breakpoint abnormality can also be realized by other modes, for instance, by combining the aforementioned three concrete examples or any two concrete examples. This embodiment does not restrict the specific process of outputting of the site information of the breakpoint abnormality.

S220: instructing to execute an instruction next to the instruction at the breakpoint in the source program code when the breakpoint abnormality is occurred in the delay slot (namely exiting breakpoint abnormality processing process, returning to the source program code, and continuing to perform normal instruction processing process from the instruction next to the instruction at the breakpoint in the source program code), and instructing to execute a second instruction next to the instruction at the breakpoint in the source program code when the breakpoint abnormality is not occurred in the delay slot (namely exiting breakpoint abnormality processing process, returning to the source program code, and continuing to perform normal instruction processing process from the second instruction next to the instruction at the breakpoint in the source program code).

S230: instructing to execute a third instruction next to the instruction at the breakpoint in the source program code, namely exiting the breakpoint abnormality processing process, returning to the source program code, and continuing to perform normal instruction processing process from the third instruction next to the instruction at the breakpoint in the source program code.

As can be known from the description of the above second embodiment, by determining the abnormal instruction that causes the breakpoint abnormality, and instructing to execute different processing operations with respect to the determining results, correct debugging of the pass-by breakpoint is guaranteed; by determining whether to obtain or output site information of the breakpoint abnormality according to breakpoint triggered core information, jumped breakpoint information, and breakpoint and task binding information, it is possible to realize pass-by debugging for a certain core or a certain process under a multi-core multi-process condition, hence possible to realize such specific pass-by breakpoint debugging as the breakpoint abnormality being triggered on a specific core, triggered at a specific position, and triggered on a specific task, to thereby meet the pass-by breakpoint debugging requirements of single-core single-process, multi-core multi-process, multi-core non-shared code segment, and multi-core shared code segment, and to enhance program debugging efficiency.

Third embodiment: Pass-by Breakpoint Setting and Debugging Methods. This embodiment is described below with reference to FIGS. 3 and 3A.

Figure 3:
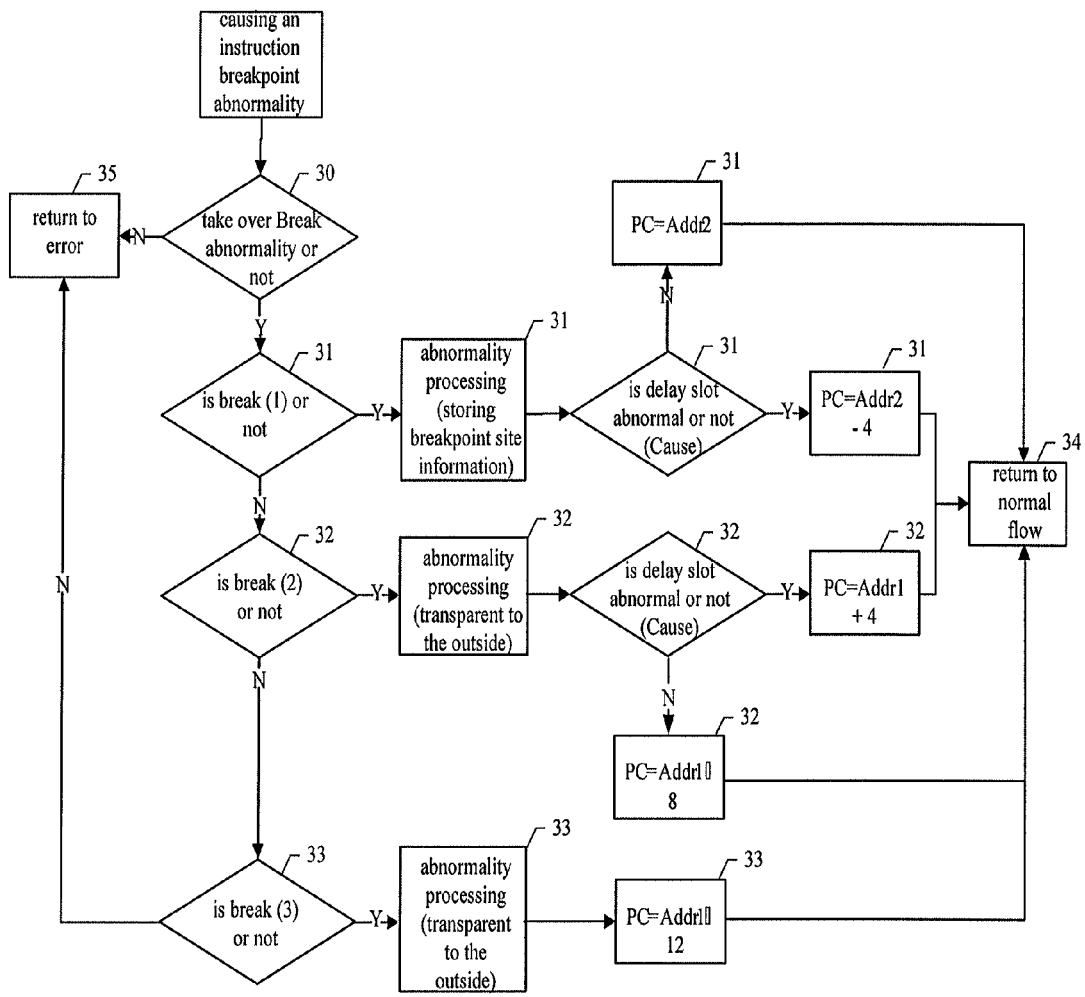
FIG. 3 is a flowchart illustrating a pass-by breakpoint debugging method according to a third embodiment of the present invention.
Figure 3A:
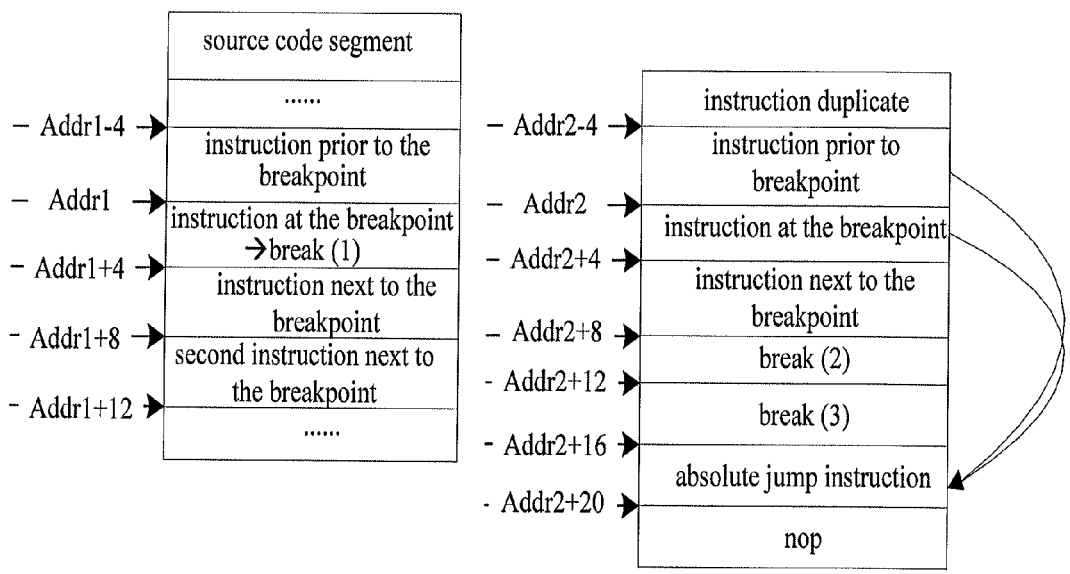
FIG. 3A is a schematic diagram illustrating a memory space according to the third embodiment of the present invention.

FIG. 3 is a flowchart illustrating a pass-by breakpoint debugging method. FIG. 3A is a schematic diagram illustrating source program code segment and program code segment of an instruction duplicate as set. The left half of FIG. 3A is a schematic diagram illustrating the source program code segment, and the right half of FIG. 3A is a schematic diagram illustrating the program code segment of the instruction duplicate.

In FIG. 3A, Addr1−4, Addr1, Addr1+4, Addr1+8 and Addr1+12 are storage addresses of instructions in the source program code segment, and Addr2−4, Addr2, Addr2+4, Addr2+8, Addr2+12, Addr2+16 and Addr2+20 are storage addresses of instructions in the program code segment of the instruction duplicate. The storage addresses shown in FIG. 3A are merely by way of example, and do not indicate that each instruction must be stored in the manner as shown in FIG. 3A.

On receipt of a breakpoint setting command carrying therewith breakpoint position information and breakpoint attribute information, the breakpoint position information and breakpoint attribute information are obtained from the breakpoint setting command, and the breakpoint attribute information is stored.

An instruction at the breakpoint in the source program code is determined according to the obtained breakpoint position information, and the instruction at the breakpoint in the source program code is the instruction stored in Addr1 shown in FIG. 3A. The instruction at the breakpoint and an instruction prior to the instruction at the breakpoint in the source program code are analyzed. If one of the two instructions is a relative jump instruction, the instruction at the breakpoint, the instruction prior to the instruction at the breakpoint, and an instruction next to the instruction at the breakpoint in the source program code are stored in the instruction duplicate; otherwise, the instruction at the breakpoint in the source program code can be directly stored in the instruction duplicate. The storage address of the instruction at the breakpoint in the source program code is Addr2 in the instruction duplicate, the storage address of the instruction prior to the instruction at the breakpoint in the source program code is Addr2−4 in the instruction duplicate, and the storage address of the instruction next to the instruction at the breakpoint in the source program code is Addr2+4 in the instruction duplicate. The relative jump instruction stored in the duplicate should be translated as an absolute jump instruction; in other words, the jump relative offset of the relative jump instruction in the instruction duplicate should be the storage address of the absolute jump instruction. If the absolute jump instruction is stored at storage address Addr2+16 in the instruction duplicate, the jump relative offset of the relative jump instruction in the instruction duplicate should be Addr2+16, while other characteristics of the relative jump instruction in the instruction duplicate remain unchanged.

In this embodiment the jump relative offset of the relative jump instruction can be modified before the relative jump instruction is stored in the instruction duplicate, and the modified relative jump instruction is subsequently stored in the duplicate. It is also possible to not firstly modify the jump relative offset of the relative jump instruction, but firstly store the relative jump instruction in the instruction duplicate, and thereafter modify the jump relative offset of the relative jump instruction. Moreover, as should be explained, before the jump relative offset of the relative jump instruction is modified, there may be no absolute jump instruction stored in the instruction duplicate, in which case it is possible to modify the jump relative offset of the relative jump instruction according to a preset storage position of the absolute jump instruction in the instruction duplicate. If the absolute jump instruction has already been stored in the instruction duplicate prior to the jump relative offset of the relative jump instruction is modified, it is possible to modify the jump relative offset of the relative jump instruction according to the actual storage position of the absolute jump instruction in the instruction duplicate. In other words, during the process of setting the instruction duplicate, it is possible to either firstly store the absolute jump instruction and subsequently store the relative jump instruction, or firstly store the relative jump instruction and subsequently store the absolute jump instruction; moreover, the jump relative offset of the relative jump instruction can be modified either before the relative jump instruction is stored in the instruction duplicate or after the relative jump instruction is stored in the instruction duplicate.

The jump absolute offset of the absolute jump instruction is set according to the jump relative offset of the relative jump instruction in the source program code; in other words, the jump absolute offset of the absolute jump instruction is the jump relative offset before modification of the relative jump instruction in the instruction duplicate.

The instruction next to the absolute jump instruction in the instruction duplicate in FIG. 3A is an invalid instruction, namely a nop instruction. The invalid instruction is set for a delay slot caused by the absolute jump instruction. The storage address of the nop instruction is Addr2+20 in the instruction duplicate.

A second abnormal instruction Break, which can be expressed as Break (2), is stored in the instruction duplicate at storage address Addr2+8. A third abnormal instruction Break, which can be expressed as Break (3), is stored in the instruction duplicate at storage address Addr2+12.

After setting of the instruction duplicate as described above, the instruction at the breakpoint in the source program code segments can be modified as a first abnormal instruction Break, which can be expressed as Break (1).

As should be explained, Addr1+X and Addr2+X in FIG. 3A merely indicate a logical sequence, as the interval between storage addresses of the instructions is not necessarily 4. Moreover, such invalid instructions as nop and sync can be inserted between the instruction prior to the instruction at the breakpoint and the instruction at the breakpoint, between the instruction at the breakpoint and the instruction next to the instruction at the breakpoint, and after the instruction next to the instruction at the breakpoint in the instruction duplicate shown in FIG. 3A.

After setting of the pass-by breakpoint as described above, the source program code are run, during which running process Break (1) in the source program code will cause breakpoint abnormality, and the process goes to the flow shown in FIG. 3 after occurrence of the breakpoint abnormality. As should be explained, this embodiment aims to describe the pass-by breakpoint debugging method, while, as a matter of fact, the abnormality as occurred during the actual running process of the source program code might not be caused by Break (1), but the process goes to S300 no matter whether it is caused by Break (1).

In FIG. 3, S300: determining whether abnormality is taken over; namely to determine whether the abnormality is breakpoint abnormality caused by Break; the process goes to S310 if it is determined that it is breakpoint abnormality caused by Break; otherwise, the process goes to S350.

S310: determining whether the breakpoint abnormality is caused by Break (1). The process goes to S311 if it is determined that the breakpoint abnormality is caused by Break (1); otherwise, the process goes to S320.

S311: executing breakpoint abnormality processing operation, namely to obtain site information of the breakpoint abnormality, and to store the obtained site information in a designated storage position; the process goes to S312.

S312: determining whether the breakpoint abnormality is occurred in a delay slot. A Cause register can be used to determine whether the breakpoint abnormality is occurred in a delay slot. The process goes to S313 if it is determined that the breakpoint abnormality is occurred in a delay slot; otherwise, the process goes to S314.

S313: pointing a program counter (PC) to the instruction prior to the instruction at the breakpoint in the instruction duplicate, namely to set PC=Addr2−4. The process goes to S340.

In a case it is determined that the breakpoint abnormality is occurred in the delay slot, the instruction prior to the instruction at the breakpoint must be a relative jump instruction and jump must occur therein, thus, since the instruction prior to the instruction at the breakpoint is not yet executed, the instruction prior to the instruction at the breakpoint should be executed anew. S313 then instructs to continue to normally execute the instruction prior to the instruction at the breakpoint.

S314: pointing the PC to the instruction at the breakpoint in the instruction duplicate, namely to set PC=Addr2. It suffices to execute the instruction at the breakpoint when it is determined that the abnormality is not occurred in the delay slot. The process goes to S340.

S340: exiting the breakpoint abnormality processing operation, namely to continue to normally execute corresponding instructions as indicated by the PC.

S320: determining whether the breakpoint abnormality is caused by Break (2). The process goes to S321 if it is determined that the breakpoint abnormality is caused by Break (2); otherwise, the process goes to S330.

S321: entering breakpoint abnormality processing operation which is transparent to the outside, that is, the user will not know of the breakpoint abnormality processing operation; the process goes to S322. As should be explained, S321 can be omitted by directly going to S322 from S320.

S322: determining whether the breakpoint abnormality is occurred in a delay slot. A Cause register can be used to determine whether the breakpoint abnormality is occurred in a delay slot. The process goes to S323 if it is determined that the breakpoint abnormality is occurred in a delay slot; otherwise, the process goes to S324.

S323: pointing the PC to the instruction next to the instruction at the breakpoint in the source program code, namely to set PC=Addr1+4. The process goes to S340.

In a case it is determined that the breakpoint abnormality is occurred in the delay slot, the instruction next to the instruction at the breakpoint must be a relative jump instruction and jump must occur therein, thus, since the instruction next to the instruction at the breakpoint is not yet executed, the instruction next to the instruction at the breakpoint in the source program code should be executed. S323 then instructs to execute the instruction next to the instruction at the breakpoint in the source program code.

S324: pointing the PC to the second instruction next to the instruction at the breakpoint in the source program code, namely to set PC=Addr1+8. It suffices to execute the second instruction next to the instruction at the breakpoint in the source program code when it is determined that the breakpoint abnormality is not occurred in the delay slot. The process goes to S340.

S330: determining whether the breakpoint abnormality is caused by Break (3). The process goes to S331 if it is determined that the breakpoint abnormality is caused by Break (3); otherwise, the process goes to S350.

It is rare for Break (3) to cause abnormality, for instance, Break (3) causes breakpoint abnormality only when the instruction next to the instruction at the breakpoint is a Likely-type jump instruction and no jump is occurred therein. When the instruction next to the instruction at the breakpoint is a Likely-type jump instruction and no jump is occurred therein, it suffices to jump over an instruction that does not need to run, namely to jump over Break (2) to execute Break (3).

S331: entering breakpoint abnormality processing operation which is transparent to the outside. The process goes to S332. As should be explained, S331 can be omitted by directly going to S332 from S330.

S332: pointing the PC to the third instruction next to the instruction at the breakpoint in the source program code, namely to set PC=Addr1+12. The process goes to S340.

S350: outputting erroneous information, and terminating the pass-by breakpoint debugging process.

As should be explained, when the instruction at the breakpoint or the instruction prior to the instruction at the breakpoint in the instruction duplicate is a relative jump instruction and jump really is occurred therein, the absolute jump instruction is executed according to the jump relative offset of the relative jump instruction, and returning to the source program code by the absolute jump instruction, instructions in the source program code as indicated by the jump absolute offset are continued to be executed, namely PC=jump absolute offset.

As can be known from the description of the above third embodiment, by determining whether the instruction at the breakpoint and the instruction prior to the instruction at the breakpoint are relative jump instruction, it is possible to select associated instructions with respect to the relative jump instruction to set an instruction duplicate, thus reducing the memory space occupied by the instruction duplicate; by setting the absolute jump instruction and the invalid instruction, it is possible to realize setting of the pass-by breakpoint in a case that the relative jump instruction in the instruction duplicate is modified as less as possible, and to reduce artificial errors brought in the process of setting the pass-by breakpoint as far as possible; by setting the second abnormal instruction and the absolute jump instruction in the instruction duplicate as capable of jumping back to the source program code, instructions in the source program code are continued to be executed; by setting the third instruction next to the instruction at the breakpoint in the instruction duplicate as a third abnormal instruction, a specific solving scheme is provided for the Likely-type relative jump instruction possibly included in the instruction duplicate. By determining the abnormal instruction that causes the breakpoint abnormality, and instructing to execute different processing operation with respect to the determining result, correct debugging of the pass-by breakpoint is guaranteed; by determining whether to obtain or output site information of the breakpoint abnormality according to breakpoint triggered core information, jumped breakpoint information, and breakpoint and task binding information, it is possible to realize pass-by debugging for a certain core or a certain process under a multi-core multi-process condition, hence possible to realize such specific pass-by breakpoint debugging as the breakpoint abnormality being triggered on a specific core, triggered at a specific position, and triggered on a specific task, to thereby meet the pass-by breakpoint debugging requirements of single-core single-process, multi-core multi-process, multi-core non-shared code segment, and multi-core shared code segment. Finally, the above third embodiment saves memory space as occupied and enhances program debugging efficiency.

Figure 4:
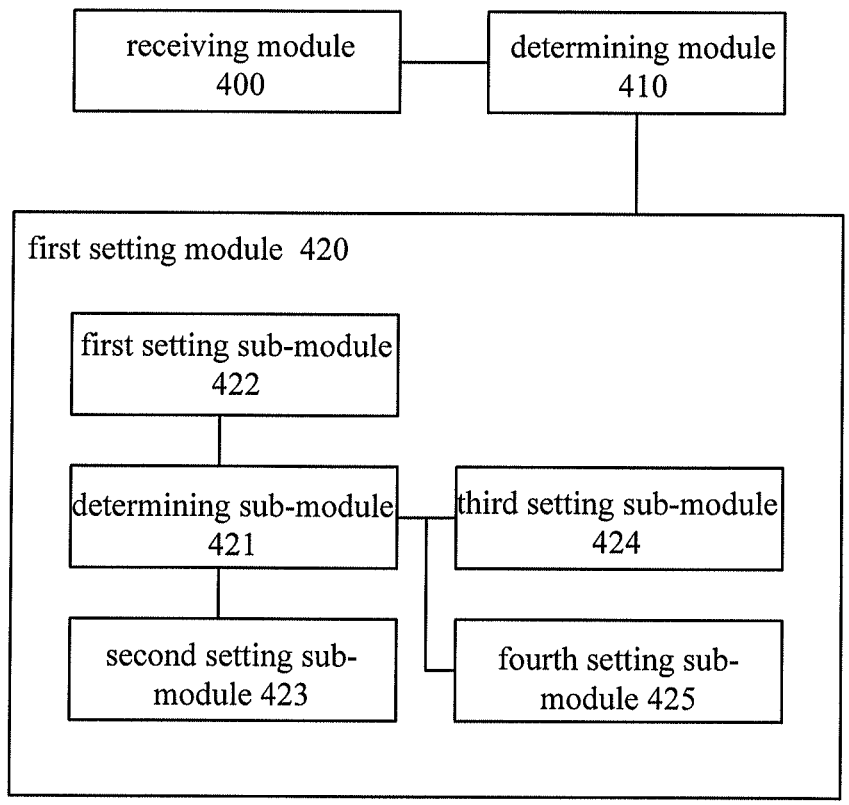
FIG. 4 is a schematic diagram illustrating a pass-by breakpoint setting device according to a fourth embodiment of the present invention.

Fourth embodiment: Pass-by Breakpoint Setting Device. The structure of the device is as shown in FIG. 4. The pass-by breakpoint setting device shown in FIG. 4 includes a receiving module 400, a determining module 410, and a first setting module 420.

The receiving module 400 is used for receiving a breakpoint setting command.

The breakpoint setting command received by the receiving module 400 may include breakpoint position information, but does not include breakpoint attribute information. The breakpoint setting command received by the receiving module 400 may also not only include breakpoint position information but also include breakpoint attribute information. The breakpoint position information herein is used to indicate which instruction in the source program code is a breakpoint instruction. Contents specifically included in the breakpoint position information and the breakpoint attribute information are as described in the above first embodiment, and are hence not repetitively described here.

The determining module 410 is used for determining an instruction at the breakpoint in source program code according to the breakpoint setting command.

There are many specific modes of execution for the determining module 410 to determine an instruction at the breakpoint in source program code according to the breakpoint setting command, and one concrete example is as follows: the determining module 410 determines the instruction at the breakpoint in the source program code according to the breakpoint position information in the breakpoint setting command; for instance, the determining module 410 determines the instruction at the breakpoint in the source program code according to an instruction name and a number of line in which the instruction resides in the breakpoint position information; for further instance, the determining module 410 searches for a storage position, an instruction in which is precisely the instruction at the breakpoint, according to an instruction storage address in the breakpoint position information. This embodiment does not restrict the specific process for the determining module 410 to realize determination of the instruction at the breakpoint in the source program code according to the breakpoint setting command.

The first setting module 420 is used for setting an instruction duplicate for a relative jump instruction and an instruction next to the relative jump instruction if one of the instruction at the breakpoint and an instruction prior to the instruction at the breakpoint is the relative jump instruction, and setting the instruction at the breakpoint in the source program code as a first abnormal instruction. The specific process for the first setting module 420 to set the instruction duplicate includes the following: the first setting module 420 stores the relative jump instruction and the instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction; the first setting module 420 sets a second valid instruction next to the relative jump instruction in the instruction duplicate as a second abnormal instruction, and the first setting module 420 sets an instruction next to the absolute jump instruction as an invalid instruction. In a case that there is no invalid instruction between the relative jump instruction and the second abnormal instruction in the instruction duplicate, the second valid instruction next to the relative jump instruction is the second instruction next to the relative jump instruction. Optionally, the specific process for the first setting module 420 to set the instruction duplicate may further include the following: the first setting module 420 sets the second or third valid instruction next to the relative jump instruction in the instruction duplicate as a third abnormal instruction.

There are many specific processes for the first setting module 420 to set an instruction duplicate for a relative jump instruction and an instruction next to the relative jump instruction; correspondingly, the instruction duplicate as set by the first setting module 420 also includes various different forms. Operations performed by sub-modules included in the first setting module 420 are described below.

The first setting module 420 includes a determining sub-module 421. Besides the determining sub-module 421, the first setting module 420 further includes one or more of a first setting sub-module 422, a second setting sub-module 423 and a third setting sub-module 424. Moreover, the first setting module 420 may optionally further include a fourth setting sub-module 425.

The determining sub-module 421 is used for determining whether one of the instruction at the breakpoint and the instruction prior to the instruction at the breakpoint is a relative jump instruction.

The first setting sub-module 422 is used for setting an instruction duplicate for the instruction prior to the instruction at the breakpoint, the instruction at the breakpoint and the instruction next to the instruction at the breakpoint in a case that the determining sub-module 421 determines that one of the instruction at the breakpoint and the instruction prior to the instruction at the breakpoint is a relative jump instruction, and setting the instruction at the breakpoint in the source program code as a first abnormal instruction. The operation for the first setting sub-module 422 to set the instruction duplicate includes: the first setting sub-module 422 stores the instruction prior to the instruction at the breakpoint, the instruction at the breakpoint, and the instruction next to the instruction at the breakpoint in the instruction duplicate, a jump relative offset of the relative jump instruction in the instruction duplicate being set according to a storage position of an absolute jump instruction in the instruction duplicate, a jump absolute offset of the absolute jump instruction in the instruction duplicate being an original jump relative offset of the relative jump instruction; the first setting sub-module 422 sets a second valid instruction next to the instruction at the breakpoint in the instruction duplicate as a second abnormal instruction, and the first setting sub-module 422 sets an instruction next to the absolute jump instruction as an invalid instruction.

In other words, if one of the instruction at the breakpoint and the instruction prior to the instruction at the breakpoint is a relative jump instruction, the instruction duplicate set by the first setting sub-module 422 may include the instruction prior to the instruction at the breakpoint in the source program code, the instruction at the breakpoint in the source program code, the instruction next to the instruction at the breakpoint in the source program code, the second abnormal instruction, the absolute jump instruction, and the invalid instruction.

Optionally, the first setting sub-module 422 may further set the third valid instruction next to the instruction at the breakpoint in the instruction duplicate as a third abnormal instruction; that is to say, the instruction duplicate set by the first setting sub-module 422 also includes a third abnormal instruction.

The second setting sub-module 423 is used for setting an instruction duplicate for the instruction prior to the instruction at the breakpoint and the instruction at the breakpoint in a case that the determining sub-module 421 determines that the instruction prior to the instruction at the breakpoint is the relative jump instruction, and setting the instruction at the breakpoint in the source program code as a first abnormal instruction. The operation for the second setting sub-module 423 to set an instruction duplicate includes: the second setting sub-module 423 stores the instruction prior to the instruction at the breakpoint and the instruction at the breakpoint in the instruction duplicate, a jump relative offset of the instruction prior to the instruction at the breakpoint in the instruction duplicate being set according to a storage position of an absolute jump instruction in the instruction duplicate, a jump absolute offset of the absolute jump instruction in the instruction duplicate being a jump relative offset of the instruction prior to the instruction at the breakpoint in the source program code; the second setting sub-module 423 sets a valid instruction next to the instruction at the breakpoint in the instruction duplicate as a second abnormal instruction, and sets an instruction next to the absolute jump instruction as an invalid instruction.

In other words, in a case that the instruction prior to the instruction at the breakpoint is a relative jump instruction, the instruction duplicate set by the second setting sub-module 423 may not include the instruction next to the instruction at the breakpoint in the source program code, but include the instruction prior to the instruction at the breakpoint in the source program code, the instruction at the breakpoint in the source program code, the second abnormal instruction, the absolute jump instruction, and the invalid instruction.

Optionally, the second setting sub-module 423 may further set the second valid instruction next to the instruction at the breakpoint in the instruction duplicate as a third abnormal instruction; that is to say, the instruction duplicate set by the second setting sub-module 423 also includes a third abnormal instruction.

The third setting sub-module 424 is used for setting an instruction duplicate for the instruction at the breakpoint and the instruction next to the instruction at the breakpoint in a case that the determining sub-module 421 determines that the instruction at the breakpoint is the relative jump instruction, and setting the instruction at the breakpoint in the source program code as a first abnormal instruction. The operation for the third setting sub-module 424 to set an instruction duplicate includes: the third setting sub-module 424 stores the instruction at the breakpoint and the instruction next to the instruction at the breakpoint in the instruction duplicate, a jump relative offset of the instruction at the breakpoint in the instruction duplicate being set according to a storage position of an absolute jump instruction in the instruction duplicate, a jump absolute offset of the absolute jump instruction in the instruction duplicate being a jump relative offset of the instruction at the breakpoint in the source program code; the third setting sub-module 424 sets a second valid instruction next to the instruction at the breakpoint in the instruction duplicate as a second abnormal instruction, and sets an instruction next to the absolute jump instruction as an invalid instruction.

In other words, in a case that the instruction at the breakpoint is a relative jump instruction, the instruction duplicate set by the third setting sub-module 424 may not include the instruction prior to the instruction at the breakpoint in the source program code, but include the instruction at the breakpoint in the source program code, the instruction next to the instruction at the breakpoint in the source program code, the second abnormal instruction, the absolute jump instruction, and the invalid instruction.

Optionally, the third setting sub-module 424 may further set the third valid instruction next to the instruction at the breakpoint in the instruction duplicate as a third abnormal instruction; that is to say, the instruction duplicate set by the third setting sub-module 424 also includes a third abnormal instruction.

The fourth setting sub-module 425 is used for setting an instruction duplicate for the instruction at the breakpoint in a case that none of the instruction at the breakpoint and the instruction prior to the instruction at the breakpoint is the relative jump instruction. Setting an instruction duplicate for the instruction at the breakpoint specifically includes storing the instruction at the breakpoint in the instruction duplicate, and setting a valid instruction next to the instruction at the breakpoint in the instruction duplicate as a second abnormal instruction. The second abnormal instruction here is used to return to the source program code to continue to execute instructions in the source program code, for instance, return to the instruction next to the instruction at the breakpoint in the source program code.

The instruction duplicate as set in this embodiment by the first setting module 420 or by each of the respective sub-modules can be stored in a memory space. In addition, the aforementioned first, second and third abnormal instructions in the instruction duplicate set by the first setting module 420 or by each of the respective sub-modules may either be identical with or different from one another. A concrete example for the first, second and third abnormal instructions is Break. The aforementioned invalid instruction may be nop or sync, and so on.

As can be known from the description of the above fourth embodiment, by the first setting module 420 determining whether the instruction at the breakpoint and the instruction prior to the instruction at the breakpoint are relative jump instruction, it is possible to select associated instructions with respect to the relative jump instruction to set an instruction duplicate, to thereby save memory space occupied by the instruction duplicate; by the first setting module 420 setting the absolute jump instruction and the invalid instruction, it is possible to realize setting of the pass-by breakpoint in a case that the relative jump instruction in the instruction duplicate is modified as less as possible, so as to reduce artificial errors brought in the process of setting the pass-by breakpoint; by the first setting module 420 setting the second abnormal instruction and the absolute jump instruction in the instruction duplicate as capable of jumping back to the source program code, instructions in the source program code are continued to be executed; by the first setting module 422 setting the third instruction next to the instruction at the breakpoint in the instruction duplicate as a third abnormal instruction, a specific solving scheme is provided for the Likely-type relative jump instruction possibly included in the instruction duplicate. Finally, the above fourth embodiment saves memory space as occupied and enhances program debugging efficiency.

Figure 5:
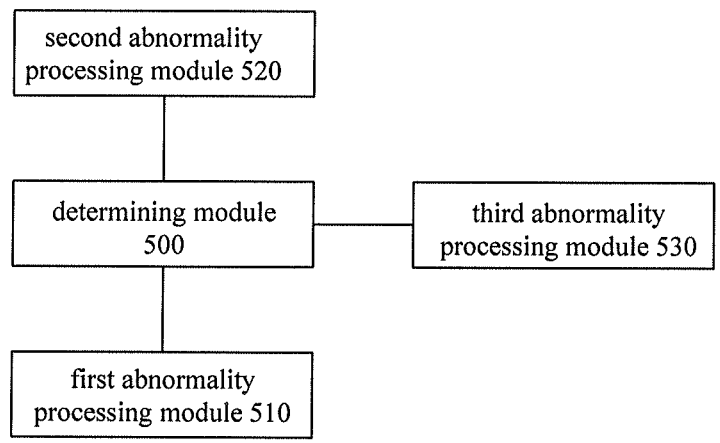
FIG. 5 is a schematic diagram illustrating a pass-by breakpoint debugging device according to a fifth embodiment of the present invention.

Fifth embodiment: Pass-by Breakpoint Debugging Device. The structure of the device is as shown in FIG. 5. The pass-by breakpoint debugging device shown in FIG. 5 includes a determining module 500, a first abnormality processing module 510 and a second abnormality processing module 520. Optionally, the device may further include a third abnormality processing module 530.

The determining module 500 is used for determining an abnormal instruction that causes breakpoint abnormality.

Optionally, before the determining module 500 determines an abnormal instruction that causes breakpoint abnormality, the determining module 500 may determines whether abnormality is taken over; that is to say, the determining module 500 determines whether abnormality as occurring is breakpoint abnormality, and determines to take over the abnormality when the determining module 500 determines that the abnormality is breakpoint abnormality, and thereafter the determining module 500 further determines the abnormal instruction that causes the breakpoint abnormality; otherwise, the determining module 500 does not perform the operation of determining the abnormal instruction that causes the breakpoint abnormality. The determining module 500 may use existing methods to perform the operation of determining whether abnormality is taken over, and this embodiment does not restrict the specific process for the determining module 500 to determine whether abnormality is taken over.

The first abnormality processing module 510 is used for obtaining and outputting site information of the breakpoint abnormality when the determining module 500 determines that the breakpoint abnormality is caused by a first abnormal instruction, instructing to execute an instruction prior to an instruction at the breakpoint in an instruction duplicate when the breakpoint abnormality is occurred in a delay slot, and instructing to execute the instruction at the breakpoint in the instruction duplicate when the breakpoint abnormality is not occurred in the delay slot.

The first abnormality processing module 510 may firstly obtain site information of the breakpoint abnormality, and then determine whether it is necessary to output the obtained site information. The first abnormality processing module 510 outputs the obtained site information when it determines it is necessary to output the obtained site information; otherwise, the first abnormality processing module 510 does not output the obtained site information. The first abnormality processing module 510 may also firstly determine whether it is necessary to obtain site information of the breakpoint abnormality, and then obtain the site information and directly output the obtained site information after it determines it is necessary to obtain site information of the breakpoint abnormality; otherwise, the first abnormality processing module 510 does not obtain site information, and hence not output site information. Moreover, the first abnormality processing module 510 may also perform an operation of determining whether to obtain site information before obtaining site information of the breakpoint abnormality, and the first abnormality processing module 510 may perform an operation of determining whether to output site information before outputting site information. The first abnormality processing module 510 may also not perform the operation of determining whether to obtain site information, and not perform the operation of determining whether to output site information, but directly obtain site information of the breakpoint abnormality and directly output the obtained site information. Concrete examples for the first abnormality processing module 510 to obtain site information of the breakpoint abnormality and to output the site information are as described in the above second embodiment, and are hence not repetitively described here.

When the determining module 500 determines that the breakpoint abnormality is caused by the second abnormal instruction, the second abnormality processing module 520 instructs to execute an instruction next to the instruction at the breakpoint in the source program code when the breakpoint abnormality is occurred in the delay slot (namely exiting breakpoint abnormality processing process, returning to the source program code, and continuing to perform normal instruction processing process from the instruction next to the instruction at the breakpoint in the source program code), and instructs to execute a second instruction next to the instruction at the breakpoint in the source program code when the breakpoint abnormality is not occurred in the delay slot (namely exiting breakpoint abnormality processing process, returning to the source program code, and continuing to perform normal instruction processing process from the second instruction next to the instruction at the breakpoint in the source program code).

When the determining module 500 determines that the breakpoint abnormality is caused by the third abnormal instruction, the third abnormality processing module 530 is used for instructing to execute a third instruction next to the instruction at the breakpoint in the source program code, namely exiting the breakpoint abnormality processing process, returning to the source program code, and continuing to perform normal instruction processing process from the third instruction next to the instruction at the breakpoint in the source program code.

The first abnormality processing module 510, the second abnormality processing module 520 and the third abnormality processing module 530 can all execute the operation of continuing to perform normal instruction processing process after exiting breakpoint abnormality processing by the mode of setting the PC. See the corresponding description in the above third embodiment for details, while repetition will not be made here.

As can be known from the description of the above fifth embodiment, by the determining module 500 determining the abnormal instruction that causes the breakpoint abnormality, and the first, second and third abnormality processing modules 510, 520 and 530 executing different processing operations with respect to the determining result, correct debugging of the pass-by breakpoint is guaranteed; by the first abnormality processing module 510 determining whether to obtain or output site information of the breakpoint abnormality according to breakpoint triggered core information, jumped breakpoint information, and breakpoint and task binding information, it is possible to realize pass-by debugging for a certain core or a certain process under a multi-core multi-process condition, hence possible to realize such specific pass-by breakpoint debugging as the breakpoint abnormality being triggered on a specific core, triggered at a specific position, and triggered on a specific task, to thereby meet the pass-by breakpoint debugging requirements of single-core single-process, multi-core multi-process, multi-core non-shared code segment, and multi-core shared code segment, and to enhance program debugging efficiency.

Figure 6:
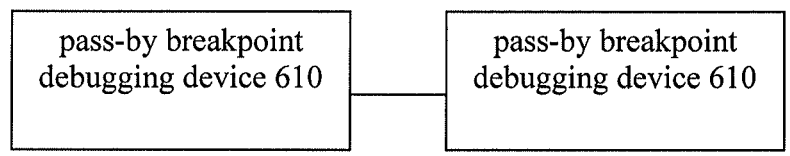
FIG. 6 is a schematic diagram illustrating a program debugging apparatus according to a sixth embodiment of the present invention.

Sixth embodiment: Program Debugging Apparatus. The structure of the apparatus is as shown in FIG. 6. The apparatus shown in FIG. 6 includes a pass-by breakpoint setting device 600 and a pass-by breakpoint debugging device 610.

The pass-by breakpoint setting device 600 is used for receiving a breakpoint setting command; determining an instruction at the breakpoint in source program code according to the breakpoint setting command; if one of the instruction at the breakpoint and an instruction prior to the instruction at the breakpoint is a relative jump instruction, setting an instruction duplicate for the relative jump instruction and an instruction next to the relative jump instruction and setting the instruction at the breakpoint in the source program code as a first abnormal instruction; wherein setting the instruction duplicate comprises: storing the relative jump instruction and the instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction, setting a second valid instruction next to the relative jump instruction in the instruction duplicate as a second abnormal instruction, and setting an instruction next to the absolute jump instruction as an invalid instruction.

Optionally, the pass-by breakpoint setting device 600 is further used for setting a third valid instruction next to the instruction at the breakpoint in the instruction duplicate as a third abnormal instruction in a case that the instruction duplicate comprises the instruction next to the instruction at the breakpoint; and setting a second valid instruction next to the instruction at the breakpoint in the instruction duplicate as a third abnormal instruction in a case that the instruction duplicate does not comprise the instruction next to the instruction at the breakpoint.

The pass-by breakpoint debugging device 610 is used for determining an abnormal instruction that causes breakpoint abnormality; obtaining and outputting site information of the breakpoint abnormality when the breakpoint abnormality is caused by a first abnormal instruction, instructing to execute an instruction prior to an instruction at the breakpoint in an instruction duplicate when the breakpoint abnormality is occurred in a delay slot, and instructing to execute the instruction at the breakpoint in the instruction duplicate when the breakpoint abnormality is not occurred in the delay slot; and if the breakpoint abnormality is caused by a second abnormal instruction, instructing to execute an instruction next to the instruction at the breakpoint in source program code when the breakpoint abnormality is occurred in the delay slot, and instructing to execute a second instruction next to the instruction at the breakpoint in the source program code when the breakpoint abnormality is not occurred in the delay slot.

Optionally, the pass-by breakpoint debugging device 610 is further used for instructing to execute a third instruction next to the instruction at the breakpoint in the source program code if it is determined that the breakpoint abnormality is caused by a third abnormal instruction.

Operations specifically executed by the pass-by breakpoint setting device 600 and the pass-by breakpoint debugging device 610 and specific structures of the pass-by breakpoint setting device 600 and the pass-by breakpoint debugging device 610 are as described in the above embodiments, and are hence not repetitively described here.

As can be known from the description of the above sixth embodiment, by the pass-by breakpoint setting device 600 determining whether the instruction at the breakpoint and the instruction prior to the instruction at the breakpoint are relative jump instruction, it is possible to select associated instructions with respect to the relative jump instruction to set an instruction duplicate, thus reducing the memory space occupied by the instruction duplicate; by the pass-by breakpoint setting device 600 setting the absolute jump instruction and the invalid instruction, it is possible to realize setting of the pass-by breakpoint in a case that the relative jump instruction in the instruction duplicate is modified as less as possible, and to reduce artificial errors brought in the process of setting the pass-by breakpoint; by the pass-by breakpoint setting device 600 setting the second abnormal instruction and the absolute jump instruction in the instruction duplicate as capable of jumping back to the source program code, instructions in the source program code are continued to be executed; by the pass-by breakpoint setting device 600 setting the third instruction next to the instruction at the breakpoint in the instruction duplicate as a third abnormal instruction, a specific solving scheme is provided for the Likely-type relative jump instruction possibly included in the instruction duplicate. By the pass-by breakpoint debugging device 610 determining the abnormal instruction that causes the breakpoint abnormality, and instructing to execute different processing operations with respect to the determining result, correct debugging of the pass-by breakpoint is guaranteed; by the pass-by breakpoint debugging device 610 determining whether to obtain or output site information of the breakpoint abnormality according to breakpoint triggered core information, jumped breakpoint information, and breakpoint and task binding information, it is possible to realize pass-by debugging for a certain core or a certain process under a multi-core multi-process condition, hence possible to realize such specific pass-by breakpoint debugging as the breakpoint abnormality being triggered on a specific core, triggered at a specific position, and triggered on a specific task, to thereby meet the pass-by breakpoint debugging requirements of single-core single-process, multi-core multi-process, multi-core non-shared code segment, and multi-core shared code segment. Finally, the above sixth embodiment saves memory space as occupied and enhances program debugging efficiency.

Figure 7:
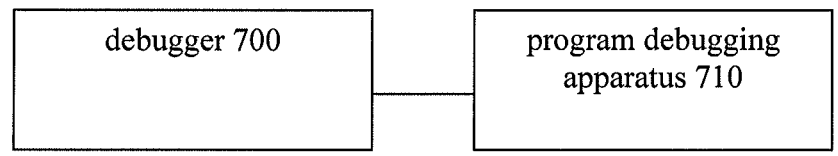
FIG. 7 is a schematic diagram illustrating a program debugging system according to seventh embodiment of the present invention.

Seventh embodiment: Program Debugging System. The structure of the system is as shown in FIG. 7. The system shown in FIG. 7 includes a debugger 700 and a program debugging apparatus 710.

The debugger 700 is used for transmitting a breakpoint setting command, and triggering source program code to run. The debugger 700 may be Shell and GDB, etc. Specific contents included in the breakpoint setting command are as described in the above embodiments, and are hence not repetitively described here.

The program debugging apparatus 710 is used for receiving a breakpoint setting command, determining an instruction at the breakpoint in source program code according to the breakpoint setting command, if it is determined that one of the instruction at the breakpoint and an instruction prior to the instruction at the breakpoint is a relative jump instruction, setting an instruction duplicate for the relative jump instruction and an instruction next to the relative jump instruction, and setting the instruction at the breakpoint in the source program code as a first abnormal instruction.

The specific operation for the program debugging apparatus 710 to set an instruction duplicate includes: storing the relative jump instruction and the instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction, setting a second valid instruction next to the relative jump instruction in the instruction duplicate as a second abnormal instruction, and setting an instruction next to the absolute jump instruction as an invalid instruction.

After the source program code is run, the program debugging apparatus 710 determines an abnormal instruction that causes breakpoint abnormality. The program debugging apparatus 710 obtains and outputs site information of the breakpoint abnormality when the breakpoint abnormality is caused by a first abnormal instruction, instructs to execute an instruction prior to an instruction at the breakpoint in an instruction duplicate when the breakpoint abnormality is occurred in a delay slot, and instructs to execute the instruction at the breakpoint in the instruction duplicate when the breakpoint abnormality is not occurred in the delay slot. If the breakpoint abnormality is caused by a second abnormal instruction, the program debugging apparatus 710 instructs to execute an instruction next to the instruction at the breakpoint in source program code when the breakpoint abnormality is occurred in the delay slot, and instructs to execute a second instruction next to the instruction at the breakpoint in the source program code when the breakpoint abnormality is not occurred in the delay slot.

Operations specifically executed by the program debugging apparatus 710 and the specific structure of the program debugging apparatus 710 are as described in the above embodiments, and are hence not repetitively described here.

As can be known from the description of the above seventh embodiment, by the program debugging apparatus 710 determining whether the instruction at the breakpoint and the instruction prior to the instruction at the breakpoint are relative jump instruction, it is possible to select associated instructions with respect to the relative jump instruction to set an instruction duplicate, thus reducing the memory space occupied by the instruction duplicate; by the program debugging apparatus 710 setting the absolute jump instruction and the invalid instruction, it is possible to realize setting of the pass-by breakpoint in a case that the relative jump instruction in the instruction duplicate is modified as less as possible, and to reduce artificial errors brought in the process of setting the pass-by breakpoint; by the program debugging apparatus 710 setting the second abnormal instruction and the absolute jump instruction in the instruction duplicate as capable of jumping back to the source program code, instructions in the source program code are continued to be executed; by the program debugging apparatus 710 setting the third instruction next to the instruction at the breakpoint in the instruction duplicate as a third abnormal instruction, a specific solving scheme is provided for the Likely-type relative jump instruction possibly included in the instruction duplicate. By the program debugging apparatus 710 determining the abnormal instruction that causes the breakpoint abnormality, and instructing to execute different processing operations with respect to the determining results, correct debugging of the pass-by breakpoint is guaranteed; by the program debugging apparatus 710 determining whether to obtain or output site information of the breakpoint abnormality according to breakpoint triggered core information, jumped breakpoint information, and breakpoint and task binding information, it is possible to realize pass-by debugging for a certain core or a certain process under a multi-core multi-process condition, hence possible to realize such specific pass-by breakpoint debugging as the breakpoint abnormality being triggered on a specific core, triggered at a specific position, and triggered on a specific task, to thereby meet the pass-by breakpoint debugging requirements of single-core single-process, multi-core multi-process, multi-core non-shared code segment, and multi-core shared code segment. Finally, the above seventh embodiment saves memory space as occupied and enhances program debugging efficiency.

As can be clearly known to those skilled in the art through the description of the foregoing embodiments, the present invention can be realized by software with the necessary hardware platform, or realized alone by hardware, though the former mode is preferred under many circumstances. On the basis of such understanding, the contribution made by the technical solution of the present invention over the prior art can be entirely or partially embodied in the form of a software product, which can be used to execute the aforementioned method steps, and which can be stored in a storage medium, such as an ROM/RAM, a magnetic disk, an optical disk and the like, and includes plural instructions enabling a computer device (such as a personal computer, a server, or a network device) to execute the methods recited in the various embodiments or certain sections of the embodiments of the present invention.

Although the present invention is described with reference to the embodiments, it is known to persons ordinarily skilled in the art that the present invention contains many variations and modifications that do not depart from the spirit and principle of the present invention, and that all these variations and modifications are covered by the claims of the application documents of the present invention.

The invention claimed is:

1. A processor-implemented pass-by breakpoint setting and debugging method, comprising:
    receiving a breakpoint setting command;
    determining an instruction at a breakpoint in a source program code according to the breakpoint setting command;
    if one of the instruction at the breakpoint and an instruction directly prior to the instruction at the breakpoint is a relative jump instruction, setting an instruction duplicate for the relative jump instruction and an instruction next to the relative jump instruction, and setting the instruction at the breakpoint in the source program code as a first abnormal instruction, wherein setting an instruction duplicate comprises: storing the relative jump instruction and the instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction, setting a second valid instruction next to the relative jump instruction in the instruction duplicate as a second abnormal instruction, and setting an instruction next to the absolute jump instruction as an invalid instruction;

and determining an abnormal instruction that causes a breakpoint abnormality, and obtaining and outputting a site information of the breakpoint abnormality.

2. The method according to claim 1, wherein storing the relative jump instruction and the instruction next to the relative jump instruction in the instruction duplicate comprises one of:

storing the instruction directly prior to the instruction at the breakpoint, the instruction at the breakpoint and the instruction next to the instruction at the breakpoint in the instruction duplicate; or storing the instruction directly prior to the instruction at the breakpoint and the instruction at the breakpoint in the instruction duplicate in a case that the instruction directly prior to the instruction at the breakpoint is the relative jump instruction; or storing the instruction at the breakpoint and the instruction next to the instruction at the breakpoint in the instruction duplicate in a case that the instruction at the breakpoint is the relative jump instruction.

3. The method according to claim 2, wherein setting an instruction duplicate further comprises one of:

setting a third valid instruction next to the instruction at the breakpoint in the instruction duplicate as a third abnormal instruction in a case that the instruction duplicate comprises the instruction next to the instruction at the breakpoint; or setting a second valid instruction next to the instruction at the breakpoint in the instruction duplicate as a third abnormal instruction in a case that the instruction duplicate does not comprise the instruction next to the instruction at the breakpoint.

4. The method according to claim 1, further comprising:

setting an instruction duplicate for the instruction at the breakpoint in a case that none of the instruction at the breakpoint and the instruction directly prior to the instruction at the breakpoint is the relative jump instruction, wherein setting an instruction duplicate for the instruction at the breakpoint comprises: storing the instruction at the breakpoint in the instruction duplicate, and setting a valid instruction next to the instruction at the breakpoint in the instruction duplicate as a second abnormal instruction.

5. The method according to claim 1, wherein the breakpoint setting command comprises a breakpoint position information, or comprises a breakpoint position information and a breakpoint attribute information, the breakpoint attribute information including one or more of a condition for obtaining site information, a condition for outputting site information, information as to whether a task should be suspended after a breakpoint causes an abnormality, and output path information of site information.

6. A pass-by breakpoint setting and debugging device having a processor, comprising:

a receiving module that receives a breakpoint setting command;

a determining module that determines an instruction at a breakpoint in a source program code according to the breakpoint setting command;

a first setting module that sets, if one of the instruction at the breakpoint and an instruction directly prior to the instruction at the breakpoint is a relative jump instruction, an instruction duplicate for the relative jump instruction and an instruction next to the relative jump instruction, and setting the instruction at the breakpoint in the source program code as a first abnormal instruction;

wherein setting an instruction duplicate comprises: storing the relative jump instruction and the instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction, setting a second valid instruction next to the relative jump instruction in the instruction duplicate as a second abnormal instruction, and setting an instruction next to the absolute jump instruction as an invalid instruction; and a pass-by break point debugging module that determines an abnormal instruction that causes a breakpoint abnormality, and obtaining and outputting a site information of the breakpoint abnormality.

7. The device according to claim 6, wherein the first setting module comprises:

a determining sub-module that determines whether one of the instruction at the breakpoint and the instruction directly prior to the instruction at the breakpoint is a relative jump instruction; and a first setting sub-module that sets an instruction duplicate for the instruction directly prior to the instruction at the breakpoint, the instruction at the breakpoint and the instruction next to the instruction at the breakpoint in a case that the determining sub-module determines that one of the instruction at the breakpoint and the instruction directly prior to the instruction at the breakpoint is the relative jump instruction, and setting the instruction at the breakpoint in the source program code as a first abnormal instruction; or a second setting sub-module that sets an instruction duplicate for the instruction directly prior to the instruction at the breakpoint and the instruction at the breakpoint in a case that the determining sub-module determines that the instruction directly prior to the instruction at the breakpoint is the relative jump instruction, and setting the instruction at the breakpoint in the source program code as a first abnormal instruction; or a third setting sub-module that sets an instruction duplicate for the instruction at the breakpoint and the instruction next to the instruction at the breakpoint in a case that the determining sub-module determines that the instruction at the breakpoint is the relative jump instruction, and setting the instruction at the breakpoint in the source program code as a first abnormal instruction.

8. The device according to claim 7, wherein
the operation for the first setting sub-module or the third setting sub-module to set an instruction duplicate further comprises setting a third valid instruction next to the instruction at the breakpoint in the instruction duplicate as a third abnormal instruction; or
the operation for the second setting sub-module to set an instruction duplicate further comprises setting a second valid instruction next to the instruction at the breakpoint in the instruction duplicate as a third abnormal instruction.

9. The device according to claim 7, wherein the first setting module further comprises a fourth setting sub-module that sets an instruction duplicate for the instruction at the breakpoint in a case that none of the instruction at the breakpoint and the instruction directly prior to the instruction at the breakpoint is the relative jump instruction, and
setting an instruction duplicate for the instruction at the breakpoint comprises storing the instruction at the breakpoint in the instruction duplicate, and setting a valid instruction next to the instruction at the breakpoint in the instruction duplicate as a second abnormal instruction.

10. A program debugging apparatus having a processor, comprising:
a pass-by breakpoint setting device that receives a breakpoint setting command, determining an instruction at a breakpoint in a source program code according to the breakpoint setting command, if one of the instruction at the breakpoint and an instruction directly prior to the instruction at the breakpoint is a relative jump instruction, setting an instruction duplicate for the relative jump instruction and an instruction next to the relative jump instruction, and setting the instruction at the breakpoint in the source program code as a first abnormal instruction, wherein setting the instruction duplicate comprises: storing the relative jump instruction and the instruction next to the relative jump instruction in the instruction duplicate, a jump relative offset of the relative jump instruction in the instruction duplicate being set according to a storage position of an absolute jump instruction in the instruction duplicate, a jump absolute offset of the absolute jump instruction being an original jump relative offset of the relative jump instruction, setting a second valid instruction next to the relative jump instruction in the instruction duplicate as a second abnormal instruction, and setting an instruction next to the absolute jump instruction as an invalid instruction; and
a pass-by breakpoint debugging device that determines an abnormal instruction that causes a breakpoint abnormality, obtaining and outputting a site information of the breakpoint abnormality if the breakpoint abnormality is caused by a first abnormal instruction, instructing to execute an instruction directly prior to an instruction at the breakpoint in an instruction duplicate when the breakpoint abnormality is occurred in a delay slot, and instructing to execute the instruction at the breakpoint in the instruction duplicate when the breakpoint abnormality is not occurred in the delay slot, and if the breakpoint abnormality is caused by a second abnormal instruction, instructing to execute an instruction next to the instruction at the breakpoint in source program code when the breakpoint abnormality is occurred in the delay slot, and instructing to execute a second instruction next to the instruction at the breakpoint in the source program code when the breakpoint abnormality is not occurred in the delay slot.

11. The apparatus according to claim 10, wherein
the pass-by breakpoint setting device is further used to set a third valid instruction next to the instruction at the breakpoint in the instruction duplicate as a third abnormal instruction in a case that the instruction duplicate comprises the instruction next to the instruction at the breakpoint, setting a second valid instruction next to the instruction at the breakpoint in the instruction duplicate as a third abnormal instruction in a case that the instruction duplicate does not comprise the instruction next to the instruction at the breakpoint, and
the pass-by breakpoint debugging device is further used to instruct to execute a third instruction next to the instruction at the breakpoint in the source program code if it is determined that the breakpoint abnormality is caused by a third abnormal instruction.

* * * * *